(Model.)
R. H. TRESTED.
HAT.
No. 280,262. Patented June 26, 1883.
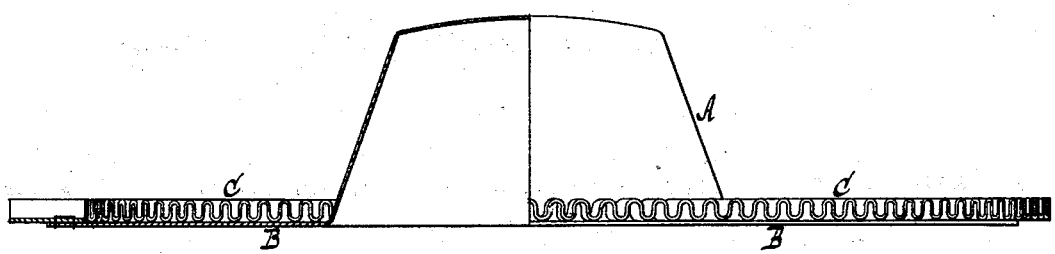
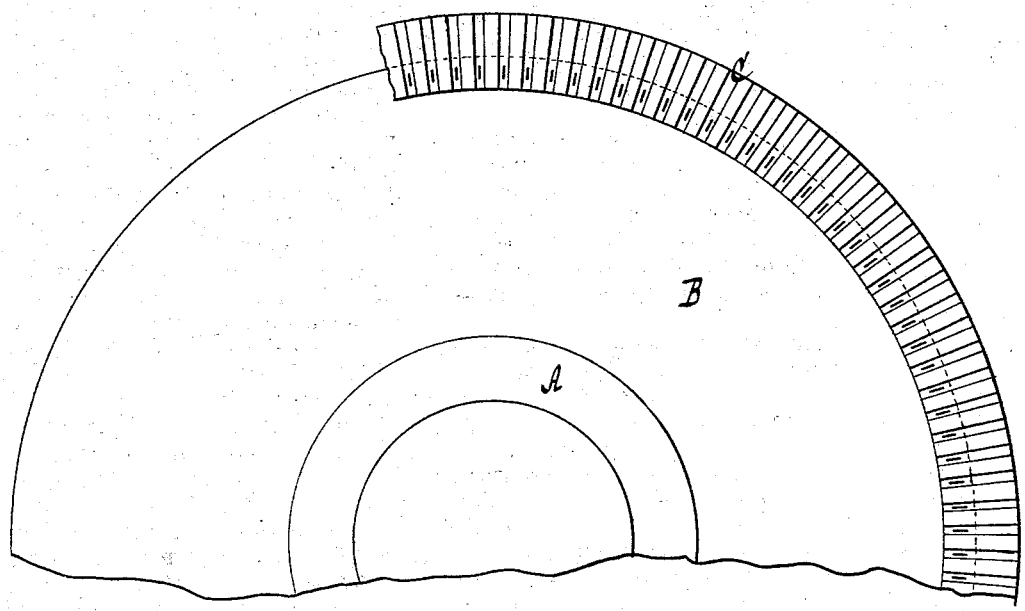
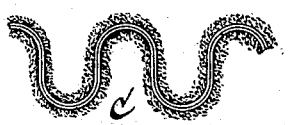
WITNESSES:
Otto Hufeland
William Miller
INVENTOR
Richard H. Trested
BY Van Santvoord & Hauff
ATTORNEYS

UNITED STATES PATENT OFFICE.

RICHARD H. TRESTED, OF GREENVILLE, NEW JERSEY.

HAT.

SPECIFICATION forming part of Letters Patent No. 280,262, dated June 26, 1883.

Application filed May 28, 1883. (Model.)

*To all whom it may concern:*

Be it known that I, RICHARD H. TRESTED, a citizen of the United States, residing at Greenville, in the county of Hudson and State of New Jersey, have invented new and useful Improvements in Hats, of which the following is a specification.

This invention relates to the combination, with a hat-brim, of a corrugated or fluted trimming of canton-flannel, plush, velvet, felt, or any other fabric napped in imitation of plush, fur, felt, sealskin, or beaver, and stiffened so as to support the brim and retain the same in position, while at the same time it serves as an ornament.

In the accompanying drawings, Figure 1 is a side elevation, partly in section. Fig. 2 is a plan or top view. Fig. 3 is a section of the trimming on an enlarged scale.
Similar letters indicate corresponding parts.

In the drawings, the letter A designates a hat which is provided with a brim, B. This brim is supported by a trimming, C, which is made of a napped fabric with the nap on both sides, and which is by preference made of two thicknesses, with the plain sides facing each other and united by a suitable adhesive substance, so that the nap or finished faces of the two layers are exposed. If one thickness is used of a fabric having a nap on both surfaces, I apply thereto a suitable stiffening material—such as a solution of shellac—which has the effect to retain the trimming in shape. After the material is dry I cut it in any desired width required and pass it through hot fluting-rollers, thereby corrugating the same to any size required. After the double-napped trimming has been finished I secure the same to the brim B, either so as to overlap the edge thereof, as shown in the drawings, or in any desired position; and since the trimming has been stiffened, as above stated, it supports the brim and serves to retain the same in position.

If desired, the trimming may be made in two different colors by uniting two layers of different colors.

By applying such fluted trimmings to the brim of a hat said brim retains sufficient pliability, and at the same time a very elegant appearance is imparted to the hat.

My trimming is of particular advantage for hats made of a napped fabric, the brims of which are limber and need a support.

What I claim as new, and desire to secure by Letters Patent, is—

1. The combination of a fluted trimming with the brim of a hat, said trimming being made of napped fabric and stiffened, substantially as shown and described.

2. The combination, with the brim of a hat, of a fluted trimming made of two thicknesses of a napped fabric united by a suitable cement, with their napped surfaces exposed, substantially as shown and described.

3. A trimming for a hat or bonnet, made of a fabric having a nap on both surfaces, and stiffened and corrugated, substantially as set forth.

In testimony whereof I have hereunto set my hand and seal in the presence of two subscribing witnesses.

RICHARD H. TRESTED. [L. S.]

Witnesses:
W. HAUFF,
E. F. KASTENHUBER.